United States Patent [19]

Verdisco

[11] 3,790,860

[45] Feb. 5, 1974

[54] POWER SUPPLY CHASSIS ASSEMBLY FOR ELECTRONIC CIRCUIT WITH COOLING

[75] Inventor: Anthony Verdisco, Port Jefferson Station, N.Y.

[73] Assignee: Trygen Electronics, Inc., Westbury, N.Y.

[22] Filed: July 17, 1972

[21] Appl. No.: 272,338

[52] U.S. Cl. .............................. 317/100, 174/15 R

[51] Int. Cl. .......................... H05k 7/20, H02b 1/04

[58] Field of Search .......... 174/DIG. 5, 15 R, 16 R; 317/100, 234

[56] References Cited

UNITED STATES PATENTS

| | | | |
|---|---|---|---|
| 3,435,891 | 4/1969 | Parrish | 174/16 R |
| 3,200,296 | 8/1965 | Bruestle | 174/16 R |
| 3,462,553 | 8/1969 | Spranger | 317/100 |
| 3,253,646 | 5/1966 | Koltuniak | 174/16 R |
| 3,201,654 | 8/1965 | Clark | 317/100 |
| 2,380,026 | 7/1945 | Clarke | 317/234 |
| 2,171,643 | 9/1939 | Brenkert | 317/234 |

*Primary Examiner*—Herman J. Hohauser
*Assistant Examiner*—Gerald P. Tolin
*Attorney, Agent, or Firm*—Edward H. Loveman

[57] ABSTRACT

A power supply assembly comprises an electrical and thermally conductive chassis frame and a base plate carrying a power transformer and a choke coil. A subassembly on the base plate includes another plate having spaced parallel flanges carrying semiconductive solid state members. Spaced bars carried by the base plate and insulated therefrom are electrically connected to the solid state electronic members. A hood on the subassembly defines a passage for an air stream (provided by a blower) to convey heat away from the assembly by thermal convection while the chassis frame, plates, flanges and bars serve to convey heat away from the solid state members by thermal conduction and radiation, in addition to servicing as a mechanical support and an electrical conductor.

2 Claims, 5 Drawing Figures

POWER SUPPLY CHASSIS ASSEMBLY FOR ELECTRONIC CIRCUIT WITH COOLING

This invention concerns a chassis assembly for an electrical power supply and more particularly concerns a chassis construction supporting an electrical power supply and arranged to protect electronic components forming part of the power supply circuit from heat generated in the power supply.

It is well known that solid state components such as semiconductive transistors, diodes and the like are very sensitive to heat and degrade rapidly if subjected to excessive heat. The situation is aggravated where such components form part of a power supply including heat generating components. Various expedients have been resorted to in an attempt to protect delicate semiconductive components from heat generated internally in a power supply and within such components. However, the various methods used have not been entirely successful or have disadvantages such as complexity of construction, high cost of thermal shielding, etc. The present invention is directed at overcoming the heat problem in a power supply chassis assembly by employing a chassis frame construction which serves as a heat sink for the electronic components it supports. The chassis frame also serves as an electrical conductor for the electronic components. The assembly includes a fan or blower to remove heat from heat generating components by convection, conduction and radiation.

According to the invention, semiconductive components forming part of an electrical power supply are mounted on and are electrically connected to members of a metal chassis subassembly which serves as a heat sink. The subassembly is mounted on a chassis frame including a base plate which supports heat generating components such as a transformer and choke, located adjacent to the subassembly. A blower or fan is arranged to pass a stream of cooling air continuously over the delicate electronic components. The power supply circuit includes capacitors which are mounted on the chassis frame and protected from heat generated in the assembly.

It is therefore a principal object of the present invention to provide a chassis construction for supporting an electrical power supply circuit in such a manner that electronic components of the power supply are protected from excessive heat generated by adjacent electrical components.

A further object of the present invention is to provide a chassis construction as described, with a subassembly including a subchassis carrying semiconductive components and serving as a heat sink, as an electrical conductor, and as a mechanical support for the components.

These and other objects and many of the attendant advantages of this invention will be readily appreciated as the same becomes better understood by reference to the following detailed description when considered in connection with the accompanying drawings in which.

Figure 1:
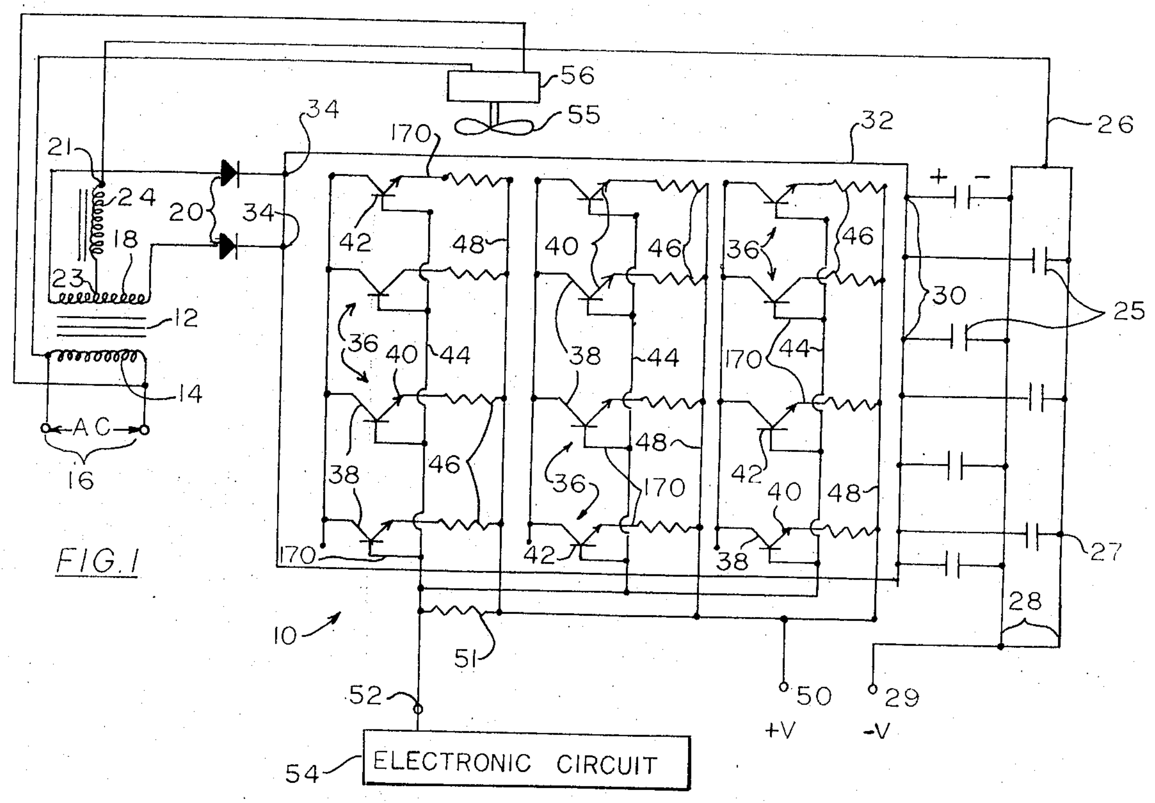
FIG. 1 is a diagram of a power supply electronic circuit utilizing the present invention.

Referring now to the drawings wherein like reference characters designate like or corresponding parts throughout, there is illustrated in FIG. 1, a power supply circuit generally designated by reference numeral 10 including a stepdown transformer 12 having a primary winding 14 with a pair of terminals 16 for connection to an external alternating current power supply. A secondary winding 18 of the transformer 12 has its end terminals connected to a pair of diode rectifiers 20. A ripple suppressing choke coil 24 is connected to a centertap 23 of the secondary winding 18. A plurality of filter capacitors 25 have their negative terminals 27 connected to a pair of bus bar 28 which are connected between a bus bar 26 and a negative DC voltage output terminal 29. The bus bar 26 is connected to the terminal 21 of the choke coil 24. The positive terminals 30 of the capacitors 25 are connected to a chassis plate 32. The negative terminals 34 of each of the rectifiers 20 is electrically connected to the plate 32 in a manner to be hereinafter described. A plurality of transistors generally designated by reference numeral 36 have their respective collectors 38 electrically connected to the plate 32 and their respective bases 42 connected to a wire 44 insulated from the plate 32 and connected to a circuit output terminal 52. One end of each of a plurality of resistors 46 is connected to each of the emitters 40 and the other end is connected to a bus bar 48 which thus connects each of the resistors 46 to a positive DC voltage terminal 50. A resistor 51 is connected between the terminal 52 and the bus bars 48. An electronic circuit 54 which may be a printed circuit board may be connected to the output terminal 52 of the power supply circuit 10.

In circuit 10, the alternating voltage at the primary winding 14 is stepped down at the secondary winding 18 and there the alternating voltage is rectified by the full wave rectifiers 20. The choke coil 24 and the capacitors 25 cooperatively smooth the pulsating direct current which is applied to the transistors 36. The transistors 36 have their respective emitters 40 and bases 42 connected together so that they are in effect diodes which supply direct current to the electronic circuit 54 at a voltage different from that supplied by the full wave rectifiers 20. It will be noted that all the transistors 36 are connected in parallel for maximizing the direct current passed to the circuit 54. A blower or fan 55 which keeps the transistors cool and dissipates heat generated by the transformer 12 and the choke 24, has a motor 56 connected to the power supply terminals 16.

In order to eliminate the adverse and degrading effects which might otherwise be caused to the transistors 36 by heat generated by the transformer 12, the choke coil 24 and the motor 56, there is provided the chassis construction shown to best advantage in FIGS. 2 – 5 to which reference is now made.

Figure 4:
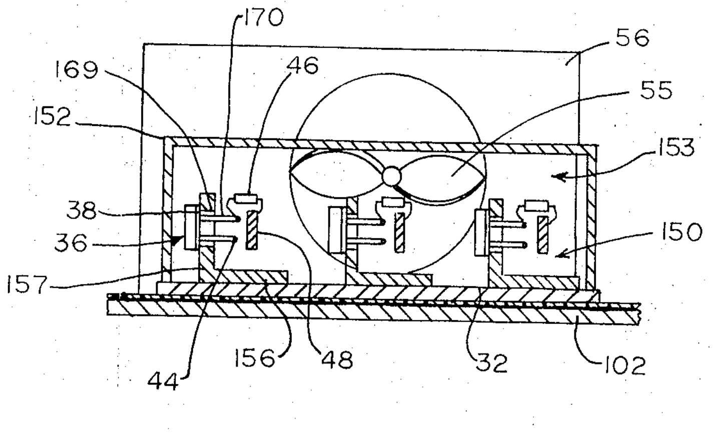
FIG. 4 is a fragmentary sectional view taken along line 4—4 of FIG. 2.
Figure 2:
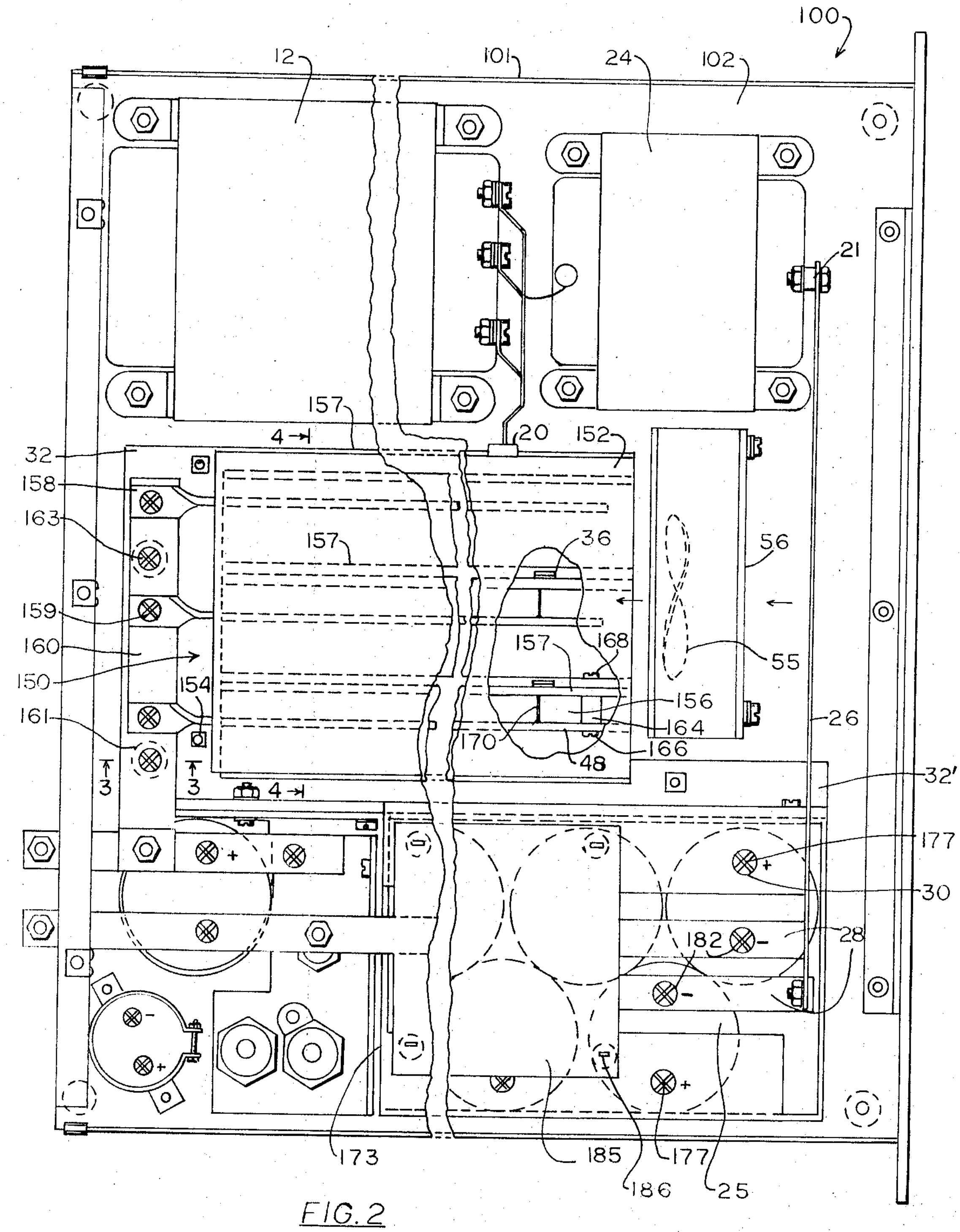
FIG. 2 is a top plan view of a chassis assembly embodying the invention, portions being broken away.
Figure 5:
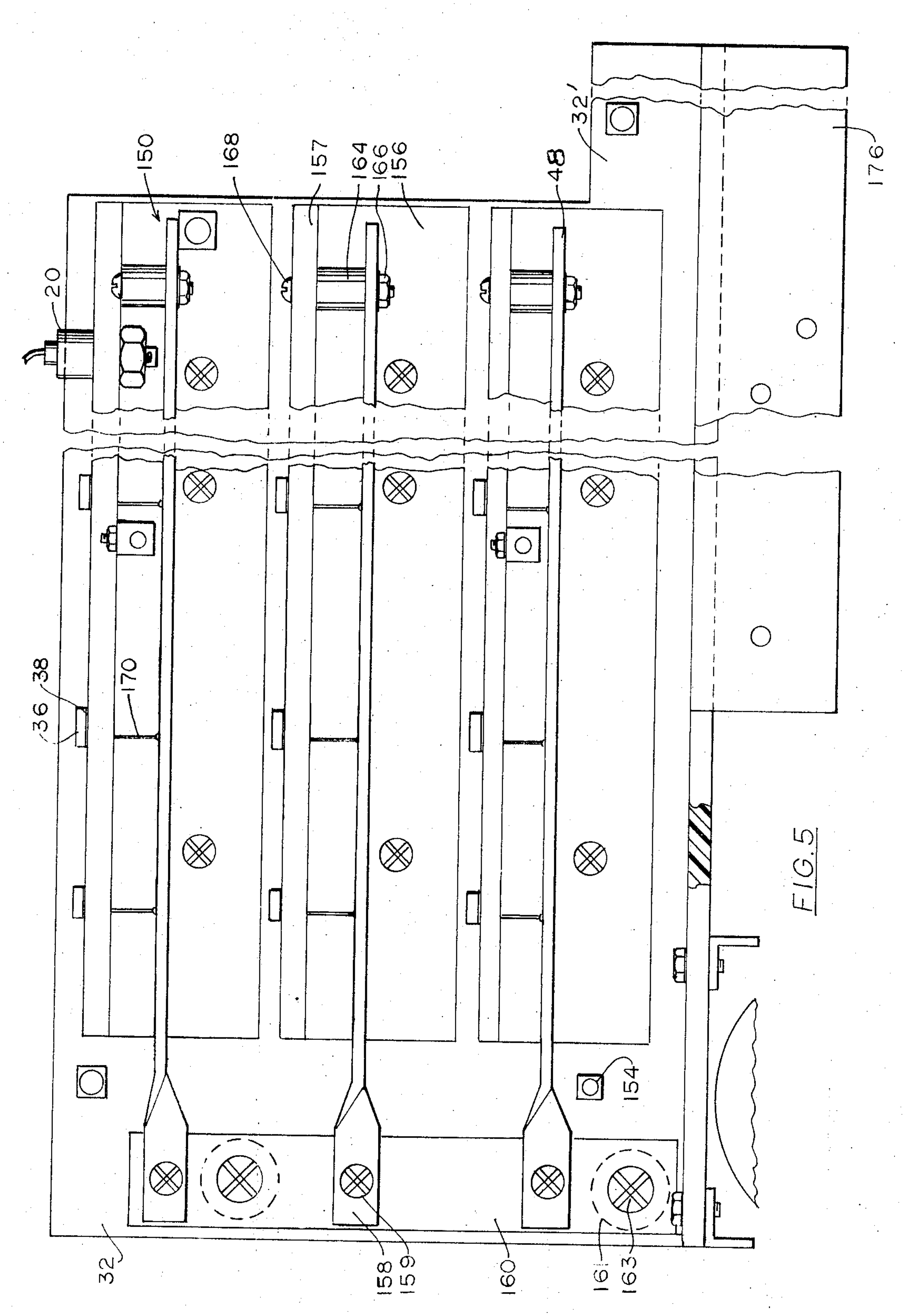
FIG. 5 is a top plan view on an enlarged scale with portions broken away or omitted of the chassis subassembly shown in FIG. 2.

Chassis assembly generally designated by reference numeral 100 includes a frame 101 and a base plate 102. On the plate 102 is mounted the transformer 12 and the choke coil 24 and adjacent thereto is the fan 55 including the motor 56. Slightly spaced from the transformer 12, the choke coil 24 and the motor 56 is an electrically conductive chassis subassembly generally designated by reference numeral 150 which is insulated (not shown) from the chassis plate 102. The conductor subassembly includes the base plate 32 referred to above in connection with FIG. 1. It will be noted as best shown in FIGS. 2 and 5 that the conductor subassembly 150 is located adjacent to the fan 55 so that an air stream may be blown over the plate 32. A hood or shroud 152 may be mounted on the plate 32 and secured by screws (not shown) to overlay components carried by this plate and define a tunnel or passage 153 (FIG. 4) for guiding an air stream over the plate 32.

Figure 3:
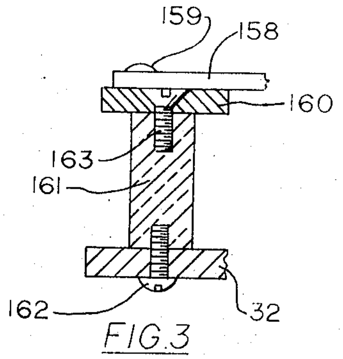
FIG. 3 is a fragmentary sectional view taken along lines 3—3 of FIG. 2.

The plate 32 is secured by a plurality of screws 154 to the plate 102 via electrically insulated spacers (not shown). Secured to the plate 32 are plates 156 (FIG. 4) and parallel upstanding ribs or flanges 157 which serve as heat radiating fins. Between the flanges 157 is the straight bus bar 48 referred to above in connection with FIG. 1. Each of the bus bars 48 are parallel to the flanges 157 and at one end, thereof is a twisted tab 158 secured by a screw 159 to a bus bar 160 which is supported by a ceramic insulative spacer 161 mounted on the plate 32 by a screw 162 (FIG. 3). A screw 163 secures the bar 160 to spacer 161. The other end of each bar 48 is carried by a standoff ceramic insulative spacer 164 mounted to an adjacent flange 157 by a screw 166. A screw 168 secures the spacer 164 to the flange 157.

Secured on the flanges 157 are the transistors 36. The collector 38 of each transistor 36 abuts a flange 157 and is thus in electrical contact therewith (FIG. 4). Each flange 57 has a multiplicity of holes 169 through which extend the lead wires 170 of the emitter and base of each transistor 36. The lead wire 170 from each of the emitters 40 is connected to the bus bar 48 via the resistor 46 (FIG. 2). By this arrangement all the transistors 36 are connected in parallel with each other. The flanges 157 serve as heat sinks to carry away heat from the delicate semiconductive transistors by conduction and radiation. Furthermore, the transistors 36 and their lead wires 170 along with the flanges 157 and the bars 48 are all located in the tunnel 153 defined by the hood 152 so that heat is carried away by convection in the air stream maintained by the fan 55 driven by the motor 56.

The capacitors 25 are enclosed in rectangular bracket 173 (FIG. 2) and are mounted on extension 32' of the plate 32. Each of the positive terminals 30 are connected by the screw 177 to the bracket 173 so that the plates 32, 102, 173 all have the same electrical potential. The bus bars 28 are insulated from the plate 102 and are connected by screws 182 to the negative terminals 27 of the capacitors 25. The bars 28 are carried by the bus bar 26 which is connected to the terminal 21 of the choke 24.

A printed circuit board 185 overlays the bracket 173 and the bus bars 28 and is secured thereto by holding tabs 186 located at its corners. This insulated board may carry the circuit 54 indicated in FIG. 1 and connected to the output terminal 52 of the power supply circuit 10.

The rectifiers 20 are mounted on the flange 157 and their mechanical arrangement is best illustrated in FIG. 5. Each rectifier 20 is a semiconductive diode having a cathode mounted directly on the flange 157 so that it is at the same potential as the collector 38 of the transistor 36. The subchassis plate 150 conducts and radiates heat away from the rectifiers 20 to keep them cool and the air stream provided by the fan 55 cools the subchassis 150 by convection.

By the arrangement described, the conductive subchassis plate 150 acts as an electrical conductor, a support, and a heat sink, so that the circuit components are protected from degrading effects of excessive heat and remain cool. The hood 152 is open at both ends so the air stream passes through it. Furthermore, this hood serves as a reflector to reflect heat rays emanated by the transformer 12 and the choke coil 24 and prevents these heat rays from reaching the delicate heat sensitive transistors 36. Thus these semiconductive components are effectively protected and can be operated continuously without overheating.

It should be understood that the foregoing relates to only a preferred embodiment of the invention, and that it is intended to cover all changes and modifications of the example of the invention herein chosen for the purposes of the disclosure, which do not constitute departures from the spirit and scope of the invention.

What is claimed is:

1. In a power supply assembly of the type wherein an alternating voltage is applied to a primary winding and is stepped down at a secondary winding which has its end terminals connected to a pair of diode rectifiers and a ripple suppressing choke coil is connected to a center top of said secondary winding and a plurality of filter capacitors cooperate with said choke coil to produce a smooth pulsating direct current which is applied to a plurality of transistors which control the magnitude of an output direct current, the improvement comprising, a support, an electrically and thermally conductive chassis subassembly mounted on said support and electrically insulated therefrom, said subassembly comprising;

a electrically conductive base plate a plurality of upstanding flanges mounted conductively on said base plate with the collectors of each of said transistors and the cathodes of each of said rectifiers in electrical and mechanical contact with said flanges; and a bracket means electrically conductively connected to said base plate with each of said filter capacitors having one terminal in electrical contact with said bracket means whereby said cathode of each of said rectifiers, said collector of each of said transistors and said one terminal of each of said capacitors are maintained at one and the same electrical potential by electrical conduction; and an airblower disposed on said support and arranged to pass an airstream over said subassembly for conveying heat therefrom by convection.

2. In a power supply assembly as defined in claim 1 the improvement further comprising a hood mounted over said subassembly in alignment with said airblower to form an air passage therefrom.

* * * * *

65